(12) United States Patent
Wu et al.

(10) Patent No.: US 12,338,909 B2
(45) Date of Patent: Jun. 24, 2025

(54) ELECTRONIC CONTROL ACTUATOR, EXHAUST GAS TREATMENT SYSTEM, AND VEHICLE COMPRISING EXHAUST GAS TREATMENT SYSTEM

(71) Applicants: NINGBO COLET ELECTRICAL APPLIANCES CO., LTD., Ningbo (CN); NINGBO XIENO ELECTROMECHANICAL CO., LTD., Ningbo (CN); NINGBO XIECHENG POWER TOOLS CO., LTD., Ningbo (CN)

(72) Inventors: Bing Wu, Ningbo (CN); Zhoutong He, Ningbo (CN); Wei Wang, Ningbo (CN); Kaifeng Zhou, Ningbo (CN); He Zhang, Ningbo (CN)

(73) Assignees: NINGBO COLET ELECTRICAL APPLIANCES CO., LTD., Ningbo (CN); NINGBO XIENO ELECTROMECHANICAL CO., LTD., Ningbo (CN); NINGBO XIECHENG POWER TOOLS CO., LTD, Ningbo (CN)

( * ) Notice: Subject to any disclaimer, the term of this patent is extended or adjusted under 35 U.S.C. 154(b) by 48 days.

(21) Appl. No.: 18/207,657

(22) Filed: Jun. 8, 2023

(65) Prior Publication Data
US 2023/0313903 A1    Oct. 5, 2023

Related U.S. Application Data

(63) Continuation-in-part of application No. PCT/CN2022/122483, filed on Sep. 29, 2022.

(30) Foreign Application Priority Data

Oct. 29, 2021   (CN) .................. 202111269830.0

(51) Int. Cl.
*F16K 31/04* (2006.01)
*F16K 31/53* (2006.01)

(52) U.S. Cl.
CPC ............ *F16K 31/047* (2013.01); *F16K 31/53* (2013.01)

(58) Field of Classification Search
USPC ....................................... 251/129.11, 129.12
See application file for complete search history.

(56) References Cited

U.S. PATENT DOCUMENTS 6,135,415 A * 10/2000 Kloda ..................... F02M 26/54
                                                                    123/568.24
6,647,960 B2 * 11/2003 Rauch ................... F16K 31/043
                                                                    267/155

(Continued)

FOREIGN PATENT DOCUMENTS

CN    108692090 A  * 10/2018   ............ F16K 31/047
CN    109450165 A  *  3/2019   ............. H02K 11/21

*Primary Examiner* — Matthew W Jellett
(74) *Attorney, Agent, or Firm* — MATTHIAS SCHOLL P.C.; Matthias Scholl (57) ABSTRACT

An electronic control actuator of the disclosure includes: a lower housing and an upper housing, the lower housing or the upper housing including a plurality of first matching holes, and the lower housing and the upper housing cooperating to form an installation space; an isolation plate disposed between the lower housing and the upper housing, the isolation plate including a plurality of second matching holes, and a plurality of locating pins respectively passing through the plurality of first matching holes and the plurality of second matching holes; and a compact gear assembly and a drive motor both disposed in the installation space, and the compact gear assembly being cooperatively connected to the drive motor.

8 Claims, 9 Drawing Sheets

(56) References Cited

U.S. PATENT DOCUMENTS

| | | | | |
|---|---|---|---|---|
| 6,860,466 B2* | 3/2005 | Sakurai | ............... | F16K 1/221 |
| | | | | 310/91 |
| 7,207,545 B2* | 4/2007 | Kawai | ............... | F02D 9/1065 |
| | | | | 251/305 |
| 9,845,748 B2* | 12/2017 | Hoki | ............... | F02M 26/25 |
| 10,197,187 B2* | 2/2019 | Hasegawa | ............... | F16K 27/02 |
| 2004/0103882 A1* | 6/2004 | Kino | ............... | F16K 1/22 |
| | | | | 123/399 |
| 2005/0109315 A1* | 5/2005 | Kamimura | ............... | F02D 11/10 |
| | | | | 123/399 |
| 2012/0124993 A1* | 5/2012 | Kim | ............... | F02B 37/186 |
| | | | | 60/602 |

* cited by examiner

ELECTRONIC CONTROL ACTUATOR, EXHAUST GAS TREATMENT SYSTEM, AND VEHICLE COMPRISING EXHAUST GAS TREATMENT SYSTEM

CROSS-REFERENCE TO RELATED APPLICATIONS

This application is a continuation-in-part of International Patent Application No. PCT/CN2022/122483 with an international filing date of Sep. 29, 2022, designating the United States, now pending, and further claims foreign priority benefits to Chinese Patent Application No. 202111269830.0 filed Oct. 29, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of exhaust gas circulation for vehicles, and more particularly to an electronic control actuator, an exhaust gas treatment system, and a vehicle comprising the exhaust gas treatment system.

With the development of vehicle industry, as an important component of vehicles, electric actuators pose an active effect on the development of the automotive industry.

With the increasing attention to environmental protection and energy conservation, an exhaust gas circulation system must be installed on the engine of the vehicles. When the vehicles are suddenly accelerated, the fuel in the engine will not be completely burned, resulting in certain combustible substances being mixed in the exhaust gas. At this time, the electronic control actuator controls the valve at the exhaust gas circulation system to open, allowing some exhaust gas to enter the engine for reburning, thereby reducing the environmental pollution caused by exhaust gas, and achieving the effect of energy saving.

However, in the related art, the internal structure of the electronic control actuator is not effectively designed, which means that the utilization rate of the internal space is low. As a result, to increase the internal space, conventional electronic control actuators are bulky. When an electronic control actuator is required to be installed into a vehicle, it is necessary to reserve a large installation space on the vehicle to facilitate the installation of the electronic control actuator.

SUMMARY

To achieve the aforesaid objective, the disclosure provides an electronic control actuator having an appropriate internal structure and overall size.

In one aspect, the electronic control actuator of the disclosure comprises: a lower housing and an upper housing, the lower housing or the upper housing comprising a plurality of first matching holes, and the lower housing and the upper housing cooperating to form an installation space; an isolation plate disposed between the lower housing and the upper housing, the isolation plate comprising a plurality of second matching holes, and a plurality of locating pins respectively passing through the plurality of first matching holes and the plurality of second matching holes; and a compact gear assembly and a drive motor both disposed in the installation space, and the compact gear assembly being cooperatively connected to the drive motor. The compact gear assembly comprises: a first reduction gear, in transmission connection to a motor shaft of the drive motor; a second reduction gear, fixedly coaxially connected to the first reduction gear, and disposed between the drive motor and the first reduction gear; and a sector gear, being meshed with the second reduction gear, the sector gear comprising a matching groove, and the motor shaft passing through the matching groove.

Compared with the related art, the technical effect achieved by this technical solution is as follows: the locating pin passes through the first matching hole and the second matching hole thus achieving the function of positioning the isolation plate to the lower housing or the upper housing. In actual installation process, either the upper housing or the lower housing is provided with the first matching hole, and thus the positioning installation of the isolation plate is realized by passing the locating pin through sequentially to the first matching hole and the second matching hole. In contrast, if the first matching hole is provided on both the upper and lower housings, it is difficult to limit and connect the locating pin to the first matching hole on the upper and lower housings simultaneously during assembly of the lower and upper housings, thereby increasing the overall assembly difficulty and reducing assembly efficiency. On the other hand, the compact gear assembly provides a compact installation space for various components within the electronic control actuator, which improves the utilization of the installation space, thereby making the housing compact, saving production costs.

Compared with the related art, the technical effect achieved by this technical solution is as follows: on the one hand, in the disclosure, the motor shaft passes through the matching groove; in the related art, the motor shaft is arranged at the external position of the sector gear, increasing the installation space reserved for the motor shaft, resulting in the installation of various internal components of the electronic control actuator not being compact. In this disclosure, the motor shaft is disposed inside the sector gear, whereby the positions between the various components are more compact, thereby reducing the size of the housing of the electronic control actuator, and to a certain extent reducing the cost of producing the housing. On the other hand, regarding the installation environment of the electronic control actuator, such as when installed on a vehicle, the design also reduces the space reserved for installing the electronic control actuator, making the overall structure more compact.

In a class of this embodiment, the lower housing comprises a limiting part disposed on one side of the locating pins away from the first matching holes; the limiting part comprises a support surface, and when the lower housing is cooperatively connected to the upper housing, the support surface abuts against one side of the isolation plate away from the first matching holes.

Compared with the related art, the technical effect achieved by this technical solution is as follows: during the actual installation of the electronic control actuator, the limiting part is sandwiched between the lower housing and the upper housing, whereby the limiting part is supported on the isolation plate, corresponding to the locating pin, the first matching hole, and the corresponding second matching hole, thereby avoiding the separation of the locating pin from the first matching hole in a dynamic installation environment of the electronic control actuator, preventing the isolation plate from moving within the installation space, preventing interference with the transmission operation of the compact gear assembly, and avoiding serious damage.

In a class of this embodiment, the first matching holes are two in number, and are disposed along a diagonal of the lower housing or the upper housing.

Compared with the related art, the technical effect achieved by this technical solution is as follows: the diagonal setting method can efficiently position the isolation plate and avoid too many first and second matching holes, which increases the number of parts in the installation space. In addition, it can also reduce the overall structural strength of the electronic control actuator if excessive number of holes are arranged.

In a class of this embodiment, the matching groove is an arc-shaped structure, and a distance between a motion trajectory of the motor shaft within the arc-shaped structure and a root circle of the sector gear is constant.

Compared with the related art, the technical effect achieved by this technical solution is as follows: in the rotation process of the sector gear, the interference caused by the motor shaft to the normal rotation of the sector gear is avoided by designing the matching groove into an arc-shaped structure.

In a class of this embodiment, the electronic control actuator further comprises: an output shaft, disposed on the upper housing and coaxially rotationally connected to the sector gear; a locating part sleeving the output shaft; and an elastic member sleeving the output shaft, the elastic member comprising a first end and a second end opposite to the first end, and the first end being connected to the locating part, and the second end being cooperatively connected to the upper housing.

Compared with the related art, the technical effect achieved by this technical solution is as follows: the locating part is sleeved on the output shaft so that the locating part is sandwiched between the sector gear and the elastic member, which on the one hand facilitates the installation of the elastic member, on the other hand, an avoidance space is formed between the elastic member and the sector gear, to avoid the motor shaft of the drive motor and avoid interference with the elastic member, so that the positions of various components within the installation space are reasonably distributed and the structure is more compact.

In a class of this embodiment, one side of the locating part facing the elastic member comprises a first groove, and the first end is cooperatively limited in the first groove; the upper housing comprises a second groove, and the second end is cooperatively limited in the second groove; and the locating part is rotatable along with the rotation of the output shaft.

Compared with the related art, the technical effect achieved by this technical solution is as follows: the elastic member is easily limited, which reduces the difficulty of positioning and installing the elastic member into the installation space, so that the elastic member can undergo effective deformation during the rotation of the output shaft. The electronic control actuator controls the valve in the exhaust gas pipeline to open or close. When the drive motor stops running, the stored elastic potential energy can be released by deformation of the elastic member, which can then be converted into power to close the valve, thereby eliminating the need to input external power to the drive motor and relying solely on the elastic force to close the valve, thereby reducing the operating work of the drive motor, extending the service life of the drive motor and saving electric energy.

In another aspect, the disclosure provides an exhaust gas treatment system comprising the electronic control actuator.

Compared with the related art, the technical effect achieved by this technical solution is as follows: the technical effect corresponding to any of the technical solutions of the electronic control actuator can also be achieved, which will not be repeated herein.

In a class of this embodiment, the system further comprises an exhaust gas circulation pipeline and a valve disposed on the exhaust gas circulation pipeline; the electronic control actuator is configured to control the opening or closing of the valve.

Compared with the related art, the technical effect achieved by this technical solution is as follows: the drive shaft of the electronic control actuator is connected to a valve shaft of the exhaust gas treatment system to control the opening or closing of the valve.

The disclosure also provides a vehicle, comprising the abovementioned electronic control actuator, or the abovementioned exhaust gas treatment system.

Compared with the related art, the technical effect achieved by this technical solution is as follows: the technical effect corresponding to any of the technical solutions of the electronic control actuator can also be achieved, which will not be repeated herein.

The following advantages are associated with the electronic control actuator, the exhaust gas treatment system, and the vehicle of the disclosure:

1. The locating pin passes through the first matching hole and the second matching hole thus achieving the function of positioning the isolation plate to the lower housing or the upper housing. In actual installation process, either the upper housing or the lower housing is provided with the first matching hole, and thus the positioning installation of the isolation plate is realized by passing the locating pin through sequentially to the first matching hole and the second matching hole. In contrast, if the first matching hole is provided on both the upper and lower housings, it is difficult to limit and connect the locating pin to the first matching hole on the upper and lower housings simultaneously during assembly of the lower and upper housings, thereby increasing the overall assembly difficulty and reducing assembly efficiency. On the other hand, the compact gear assembly provides a compact installation space for various components within the electronic control actuator, which improves the utilization of the installation space, thereby making the housing compact, saving production costs.

2. On the one hand, in the disclosure, the motor shaft passes through the matching groove; in the related art, the motor shaft is arranged at the external position of the sector gear, increasing the installation space reserved for the motor shaft, resulting in the installation of various internal components of the electronic control actuator not being compact. In this disclosure, the motor shaft is disposed inside the sector gear, whereby the positions between the various components are more compact, thereby reducing the size of the housing of the electronic control actuator, and to a certain extent reducing the cost of producing the housing. On the other hand, with regard to the installation environment of the electronic control actuator, such as when installed on a vehicle, the design also reduces the space reserved for installing the electronic control actuator, making the overall structure more compact.

3. During the actual installation of the electronic control actuator, the limiting part is sandwiched between the lower housing and the upper housing, whereby the limiting part is supported on the isolation plate, corresponding to the locating pin, the first matching hole, and the corresponding second matching hole, thereby avoiding the separation of the locating pin from the first matching hole in a dynamic installation environment of the electronic control actuator, preventing the isolation plate from moving within the installation space, preventing interference with the transmission operation of the compact gear assembly, and avoiding serious damage.

In the drawings, the following reference numbers are used: 100. electronic control actuator; 10. Lower housing; 11. Air-cooled element; 12. Water-cooled element; 13. Motor-mounting part 13; 14. Side wall; 15. Limiting part; 16. First installation space; 20. Upper housing; 21. Isolation plate; 22. Electrical control plate; 23. Locating pin; 24. Second groove; 25. Output port; 26. First matching hole; 27. Second installation space; 30. Drive motor; 31. Motor shaft; 32. First gear shaft; 33. Second gear shaft; 41. First reduction gear; 42. Second reduction gear; 43. Sector gear; 44. Matching groove; 50. Output shaft; 51. Elastic member; 52. Second end; 53. Locating part; 54. First groove.

DETAILED DESCRIPTION

To further illustrate the disclosure, embodiments detailing an electronic control actuator, an exhaust gas treatment system, and a vehicle are described below. It should be noted that the following embodiments are intended to describe and not to limit the disclosure.

Example 1

Figure 1:
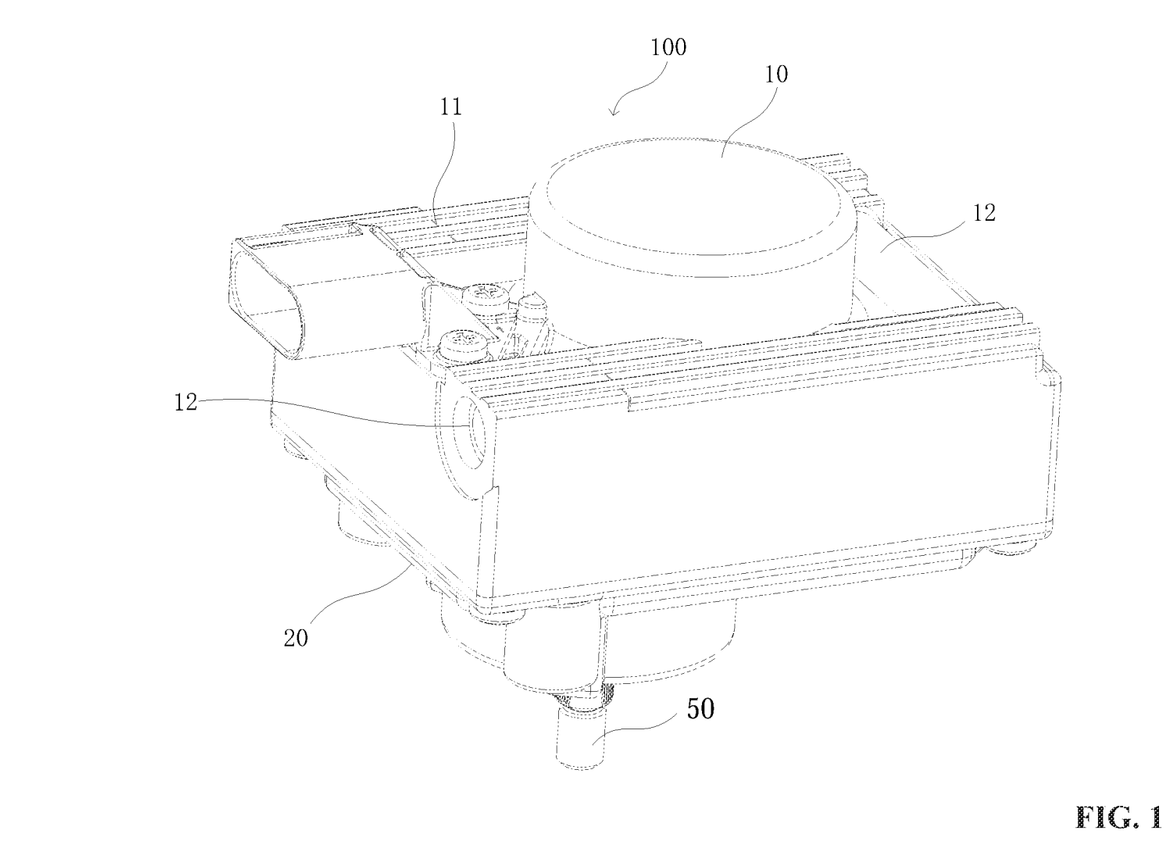
FIG. 1 is a schematic diagram of an electronic control actuator of one embodiment of the disclosure.
Figure 2:
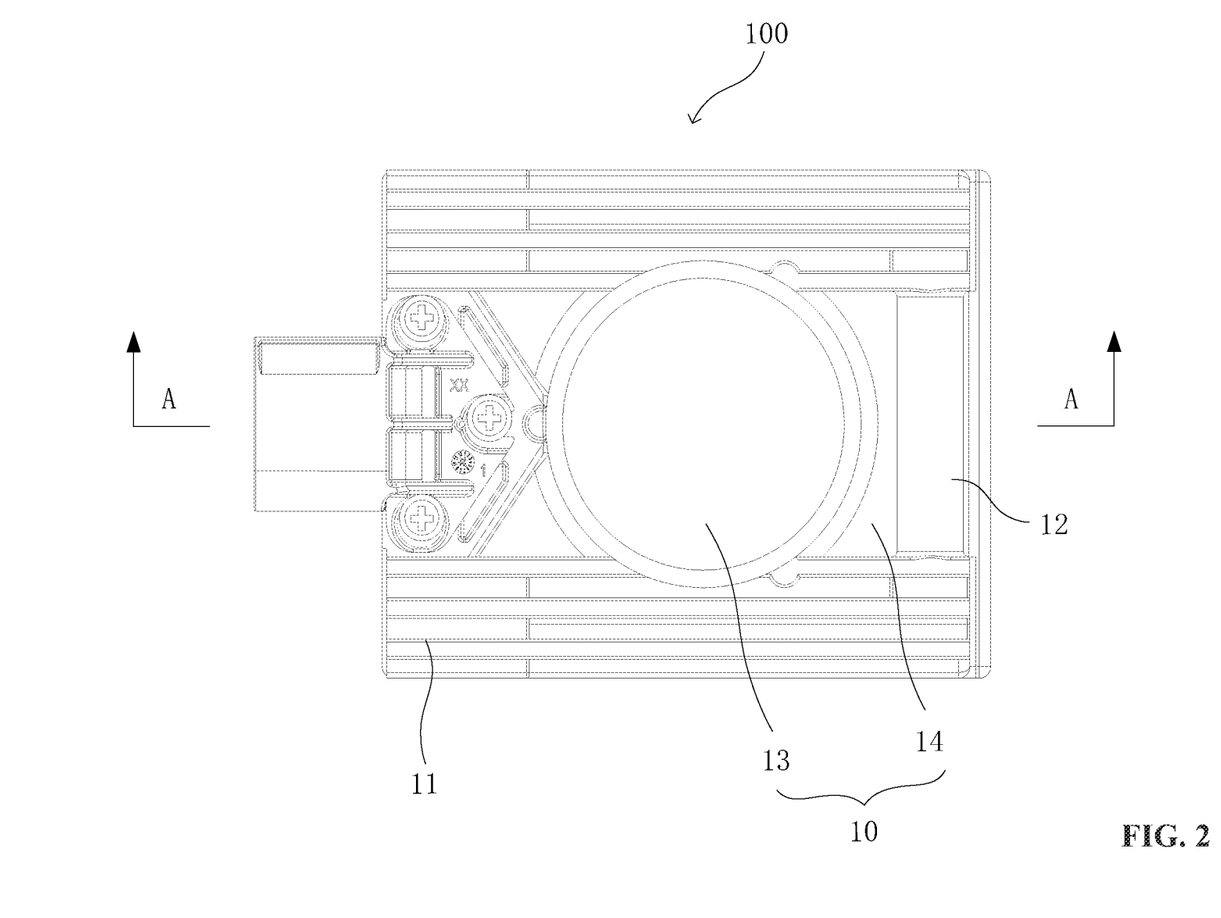
FIG. 2 is a schematic diagram of the electronic control actuator of FIG. 1 in another angle of view.
Figure 3:
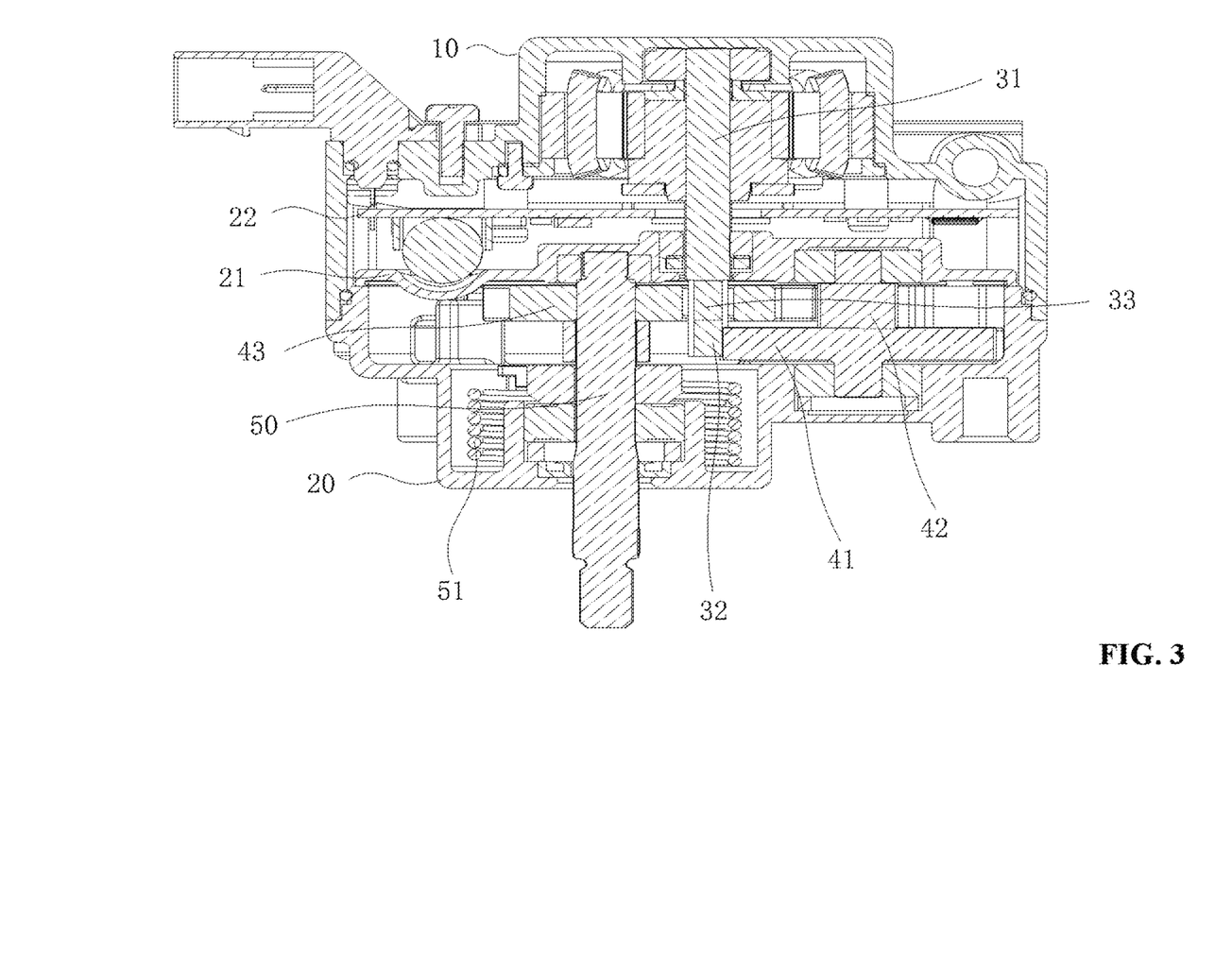
FIG. 3 is a sectional view taken from line A-A in FIG. 2.
Figure 4:
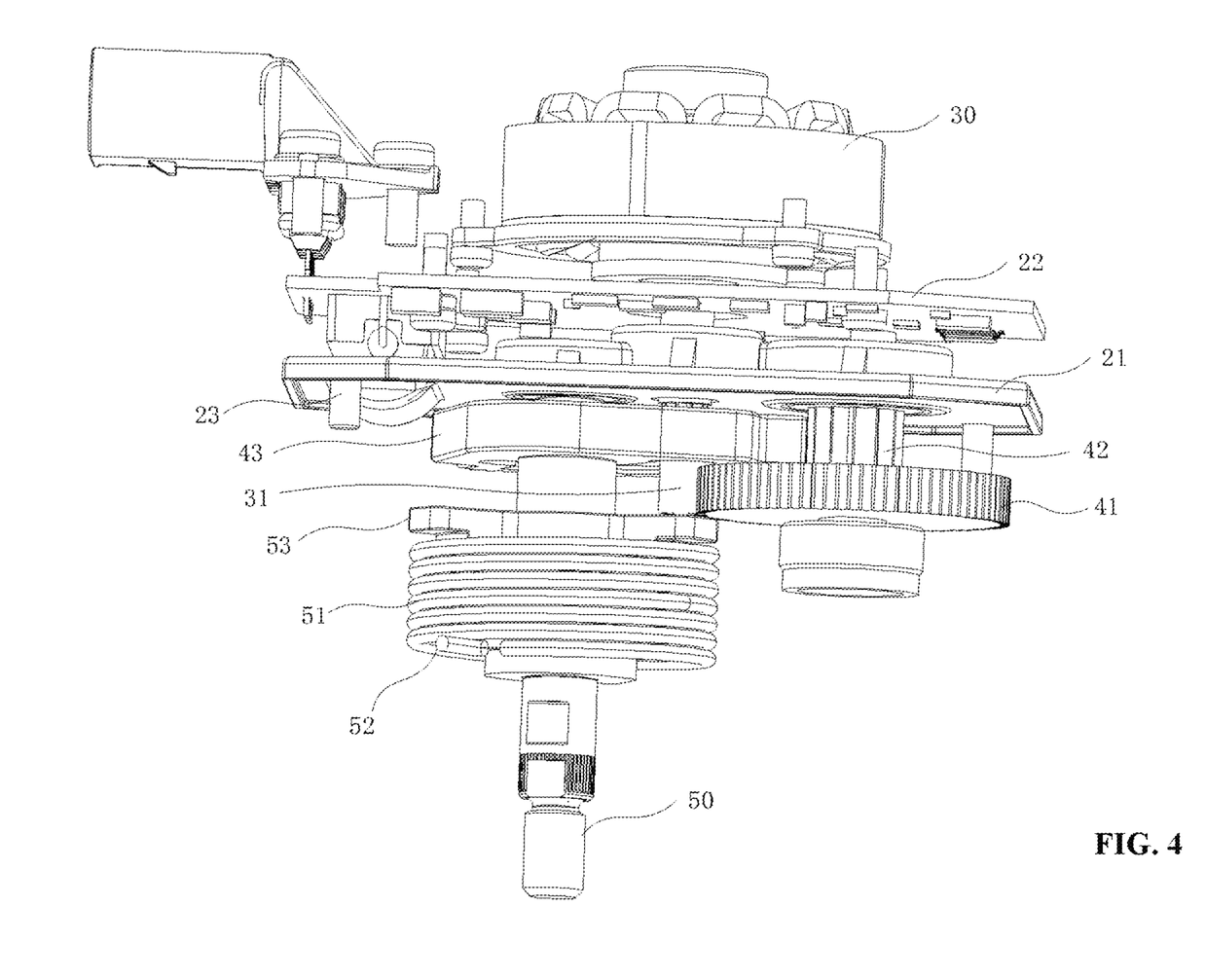
FIG. 4 is a schematic diagram of an internal structure of an electronic control actuator of one embodiment of the disclosure.

As shown in FIG. 1, an electronic control actuator 100 of the disclosure comprises a housing, a drive motor 30 and a compact gear assembly. The housing comprises an installation space. The compact gear assembly and the drive motor 30 both are disposed in the installation space, and the compact gear assembly is cooperatively connected to the drive motor. The drive motor 30 comprises a motor shaft 31, through which the drive motor is in transmission connection to the compact gear assembly.

As shown in FIGS. 2-5, the compact gear assembly comprises, for example, a first reduction gear 41, a second reduction gear 42, and a sector gear 43. The first reduction gear 41 is in transmission connection to the motor shaft 31. The second reduction gear 42 is fixedly connected coaxially to the first reduction gear 41, and the second reduction gear 42 is disposed on the side of the first reduction gear 41 near the drive motor 30. The sector gear 43 is meshed with the second reduction gear 42, and the sector gear 43 comprises a matching groove 44 cooperatively connected to the motor shaft 31. The pitch circle of the first reduction gear 41 is larger than the pitch circle of the second reduction gear 42.

In a specific embodiment, the motor shaft 31 is a gear shaft, and therefore, external meshing transmission is realized between the motor shaft 31 and the first reduction gear 41. Specifically, the motor shaft 31 and the sector gear 43 are eccentrically disposed, and the motor shaft 31 partially extends out of the matching groove 44. The part of the motor shaft 31 extending out of the matching groove 44 is defined as a first gear shaft 32, so that the first gear shaft 32 is externally meshed with the first reduction gear 41. The part of the motor shaft in the matching groove 44 is defined as a second gear shaft 33. As the sector gear 43 rotates, the second gear shaft 33 rotates in the matching groove 44 relative to the sector gear 43. Combined with the operation process of the drive motor 30, specifically, the gear shaft rotates to drive the first reduction gear 41 that meshes with the gear shaft to rotate. Due to the coaxial fixed connection between the first reduction gear 41 and the second reduction gear 42, the second reduction gear 42 is driven to rotate, and the sector gear 43 is also driven to rotate.

Figure 5:
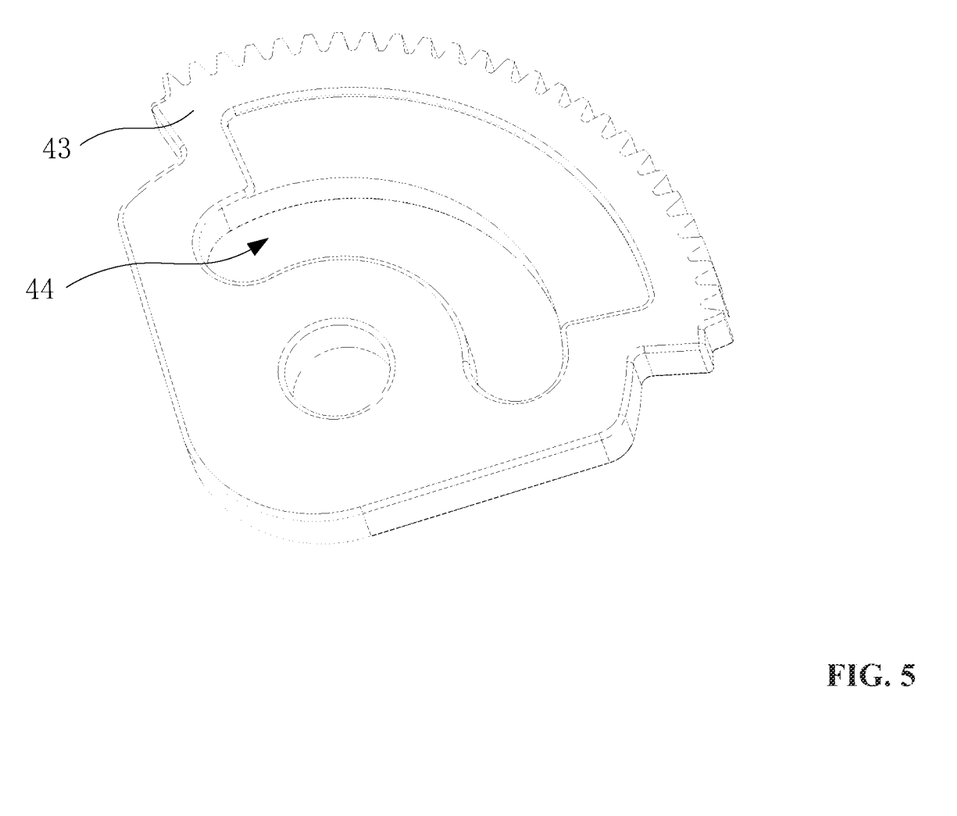
FIG. 5 is a schematic diagram of a sector gear in FIG. 4.

Optionally, the matching groove 44 is an arc-shaped structure, and the distance between the motion trajectory of the motor shaft 33 within the arc-shaped structure and the root circle of the sector gear 43 is constant.

For example, the arc-shaped structure is disposed at an eccentric position of the sector gear 43. The arc-shaped structure and the sector gear 43 are disposed at the same circle center. Specifically, the arc-shaped structure is a partially annular structure. With the rotation of the sector gear 43, the position of the second gear shaft in the arc-shaped structure moves, which can be seen as the movement of the second gear shaft within the arc-shaped structure around the axis of the sector gear 43. To prevent the sector gear 43 from rotating too far in the same direction and causing the second gear shaft to collide with the inner wall of the arc-shaped structure, the maximum number of turns that the drive motor 30 can rotate in the same direction can be preset to avoid interference with the inner wall of the arc-shaped structure during the forward or reverse rotation of the sector gear 43.

Figure 6:
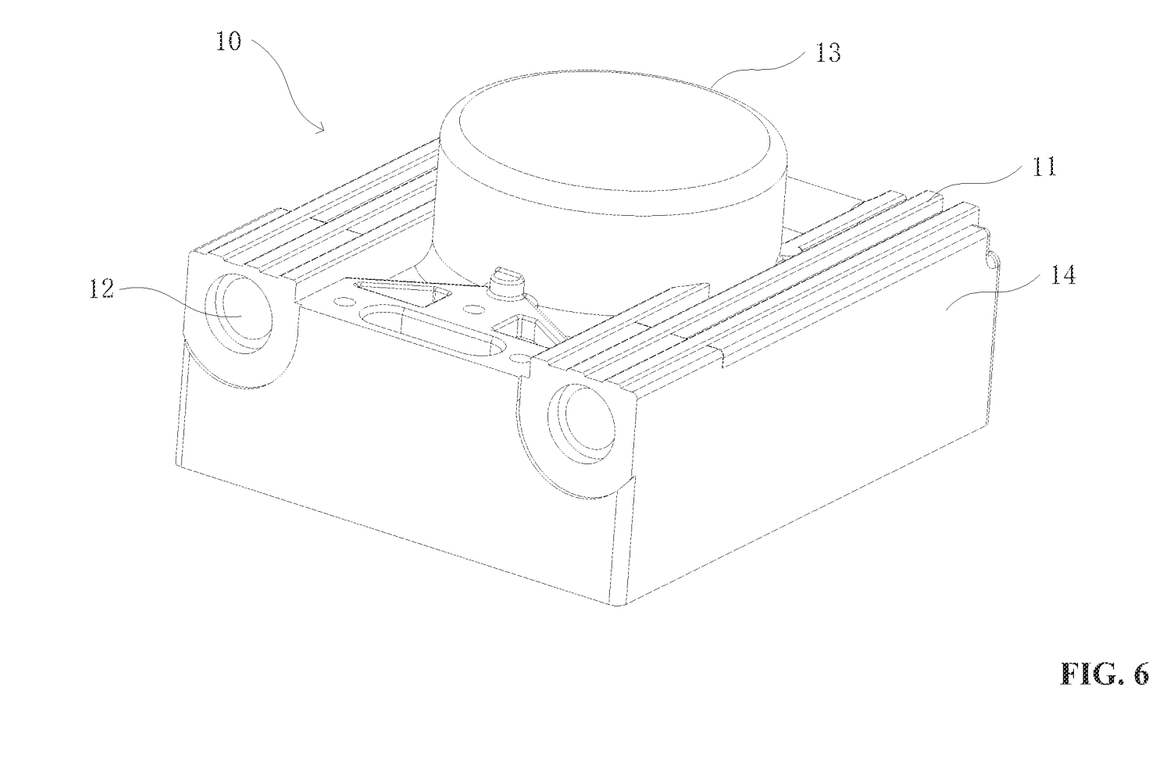
FIG. 6 is a schematic diagram of a lower housing in FIG. 1.
Figure 7:
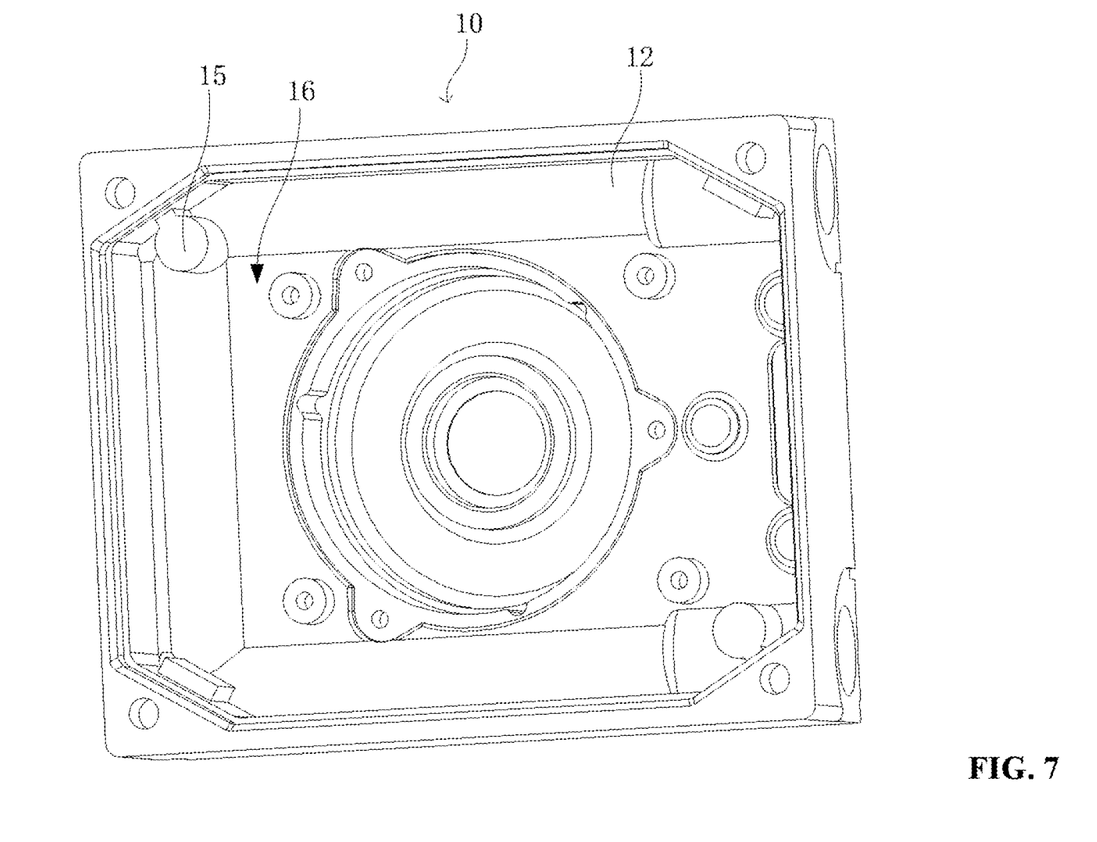
FIG. 7 is a schematic diagram of the sector gear in FIG. 6 in another angle of view.
Figure 8:
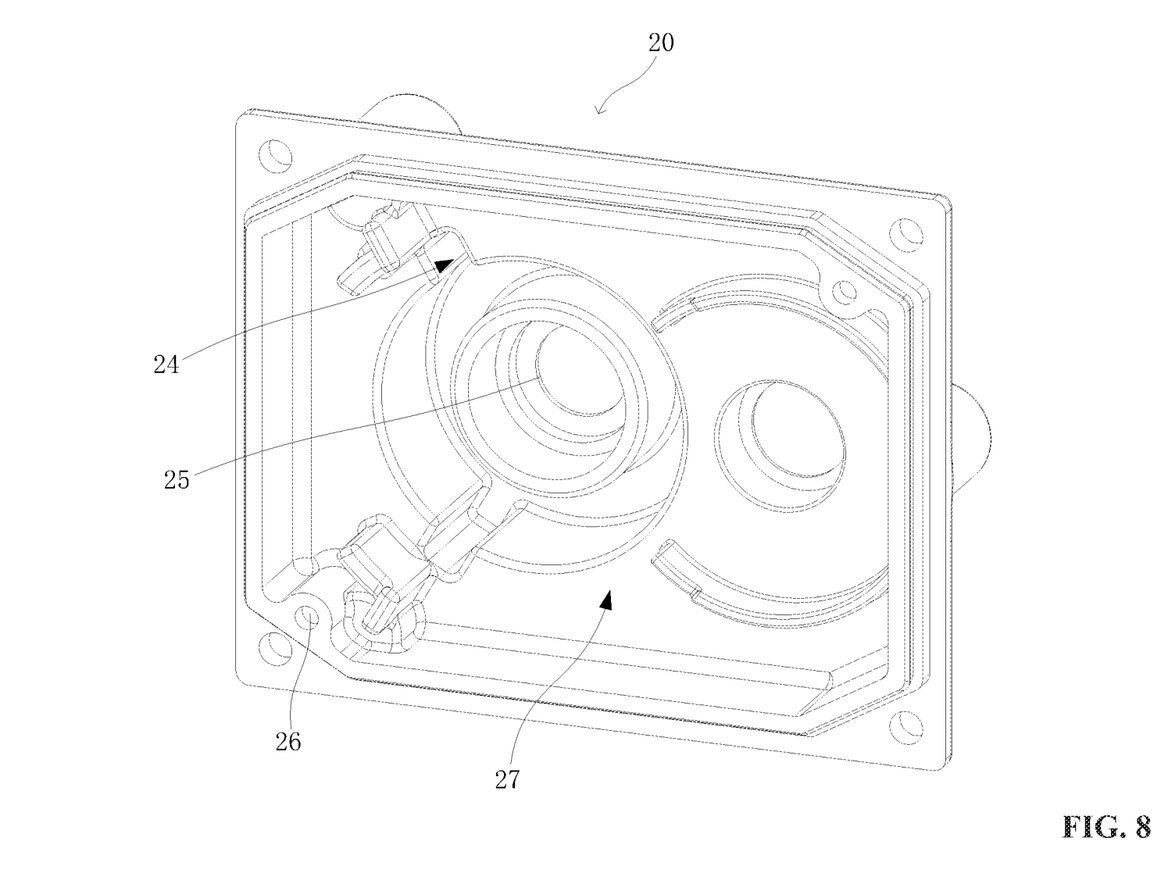
FIG. 8 is a schematic diagram of an upper housing in FIG. 2.

As shown in FIGS. 6-8, preferably, the housing comprises, for example, a lower housing 10, an upper housing 20, and an isolation plate 21. The lower housing 10 comprises a first installation space 16 for installing the drive motor 30. The upper housing 20 is cooperatively connected to the lower housing 10, and a second installation space 27 for installing the compact gear assembly is provided in the upper housing 20. The lower housing 10 or the upper housing 20 comprises a plurality of first matching holes 26, and correspondingly, the isolation plate 21 comprises a plurality of second matching holes, and the isolation plate 21 is sandwiched between the lower housing 10 and the upper housing 20. The first matching holes 26 and the second matching holes are arranged one by one in correspondence, and a plurality of locating pins respectively passes through the plurality of first matching holes 26 and the plurality of second matching holes to position and install the isolation plate 21 on the lower housing 10 or the upper housing 20. For example, the first matching holes 26 are provided on one end surface of the upper housing 20 facing the lower housing 10.

Optionally, the number of first matching holes 26 is two, and two first matching holes are arranged along the diagonal direction of the end surface. The corresponding second matching holes are also two in number, and arranged along the diagonal line of the isolation plate 21. The locating pin 23 can, for example, be a hinge pin, and both the first matching holes 26 and the second matching holes are light holes. When the hinge pin is inserted into the corresponding first matching holes 26 and the second matching holes, the upper housing or the lower housing is fixed with the isolation plate. Optionally, the locating pin 23 is a bolt, which can be tightened and threaded through the first and second matching holes 26. When the electric control actuator 100 is applied to a vehicle, the installation environment of the electric control actuator 100 is dynamic during the vehicle operation, especially when crossing obstacles. Therefore, in a vibration or shaking installation environment, the hinge pin is easy to fall off from the first matching holes 26 and the second matching holes, causing the isolation plate 21 to disengage from the upper housing 20. Similarly, it is also easy to loosen the bolt.

Further, a limiting part 15 is disposed at the position of the lower housing 10 corresponding to the locating pin 23, so that when the lower housing 10 is connected to the upper housing 20 in a coordinated manner, the limiting part 15 supports the surface of the isolation plate 21, while also avoiding the separation of the locating pin 23 from the second matching hole. For example, the limiting part 15 can be a reinforcing rib that can enhance the overall structural strength of the lower housing 10. Specifically, the limiting part 15 is arranged on one side of the locating pin 23 away from the first matching hole 26, and the limiting part 15 comprises a support surface. When the lower housing 10 is connected to the upper housing 20 in a coordinated manner, the support surface abuts against the side of the isolation plate 21 away from the first matching hole 26.

Preferably, the lower housing 10 comprises, for example, a side wall 14, a motor-mounting part 13, and an air-cooled element 11. The side wall 14 comprises a mounting side and a matching side opposite to the mounting side, and the matching side is used for fitting and connecting to the upper housing 20. The motor-mounting part 13 is arranged on the mounting side. The motor-mounting part 13 communicates with the side wall 14 to form a first installation space 16. The air-cooled element 11 is arranged on the side wall 14 and is located on the mounting side. Specifically, the air-cooled element 11 is arranged around the periphery of the motor-mounting part 13, that is, the motor-mounting part 13 can be arranged in the middle of the side wall 14, so that sufficient installation positions are reserved for the air-cooled element 11 on the side wall 14, so that the air-cooled element 11 is arranged around the periphery of the motor-mounting part 13, thereby enabling the air-cooled element 11 to provide balanced and reasonable heat dissipation with the motor-mounting part 13 as a center.

For example, the air-cooled element 11 is a heat dissipating fin group, for example, by increasing the surface area of the corresponding position of the side wall 14, thus timely releasing the heat emitted into the first mounting space 16 by the operation of the drive motor 30, thereby accelerating the cooling effect, avoiding overheating of the drive motor 30 and prolonging the service life of the drive motor.

Further, the lower housing 10 further comprises, for example, a water-cooled element 12, which is arranged in the side wall 14 and corresponds to the air-cooled part 11; the water-cooled element 12 is arranged around the periphery of the motor-mounting part 13.

Specifically, the water-cooled element 12 is, for example, a water cooling channel, and the water cooling channel is isolated from the first installation space 16. The water cooling channel comprises, for example, an inlet channel and an outlet channel. The water inlet and the water outlet of the water inlet channel are both arranged on the surface of the side wall 14, and the water inlet channel and the water outlet channel are interconnected internally.

For example, during the processing of the side wall 14, to reduce the processing difficulty, both the water inlet channel and the water outlet channel are straight channels located on the side wall 14. At the same time, to ensure that the water cooling effect of the water-cooled element 12 can be well realized, a third channel is disposed the surface of the side wall 14, and the third channel, the water inlet channel, and the water outlet channel are interconnected. When the water-cooled element 12 works for water cooling, the third channel is blocked and the coolant flows from the water inlet into the water inlet channel, then through the water outlet channel, and finally out from the water outlet.

Preferably, the electric control actuator 100 comprises, for example, an electrical control plate 22 located in the first installation space 16. Due to the fact that both the electrical control plate 22 and the drive motor 30 are located in the first installation space 16, the ambient temperature of the electrical control plate 22 is affected by the operation of the drive motor 30 and is at a higher temperature. Therefore, in combination with the above technical solution, the cooperative heat dissipation effect of the air-cooled element 11 and the water-cooled element 12 can enable the electrical control plate 22 to function normally.

Preferably, the upper housing 20 comprises an output port 25, and the electronic control actuator 100 further comprises, for example, an output shaft 50, a locating part 53, and an elastic member 51. The output shaft 50 is arranged on the upper housing 20 and partially extends out of the output port 25. The output shaft 50 is rotationally connected coaxially with the sector gear 43. The locating part 53 is sleeved on the output shaft 50. The elastic member 51 is sleeved on the output shaft 50, and the locating part 53 is sandwiched with the sector gear 43 and the elastic member.

Further, the elastic member 51 comprises a first end and a second end 52 opposite to the first end, and the first end is connected to the locating part 53. The second end 52 is cooperatively connected to the upper housing 20. In addition, the motor shaft 31 is sandwiched between the output shaft 50 and the compact gear assembly.

Figure 9:
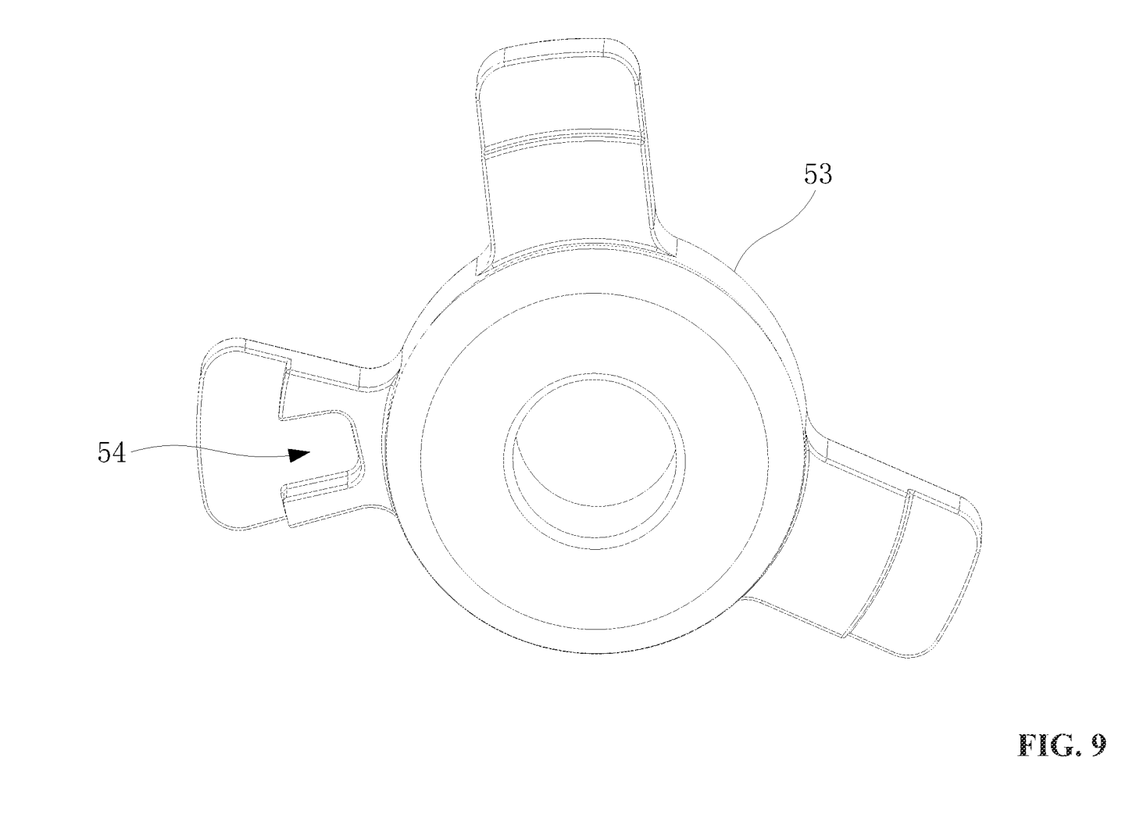
FIG. 9 is a schematic diagram of a locating part in FIG. 4.

As shown in FIG. 9, in a specific embodiment, the elastic member 51 is a torsion spring, and the side of the locating part 53 adjacent to the elastic member 51 comprises a first groove 54. The first groove 54 is cooperative with the first end, thereby realizing the connection between the torsion spring and the locating part 53. The position of the upper housing 20 corresponding to the second end 52 comprises a second groove 24, and the second end 52 is disposed in the second groove 24 to achieve the connection between the torsion spring and the upper housing 20. Since the locating part 53 is sleeved onto the output shaft 50, the locating part 53 can move synchronously with the rotation of the output shaft 50, thereby driving the first end of the torsion spring to rotate along the rotation of the output shaft 50, causing the torsion spring to be in a deformed state. When the drive motor 30 works, for example, during the forward rotation of the motor shaft 31, the output shaft 50 is driven to rotate forward, which increases the opening of the valve rotatably connected to the output shaft 50. Conversely, during the reverse rotation of the motor shaft 31, the opening of the valve continues to decrease until it is fully closed.

Therefore, when the motor shaft 31 rotates forward, the first reduction gear 41 that meshes with the motor shaft rotates inversely, and the second reduction gear 42 also rotates inversely. As the second reduction gear 42 is externally meshed with the sector gear 43, the sector gear 43 is rotated forward, which drives the output shaft 50 to rotate forward, and controls the opening of the valve in transmission connection to the output shaft. During the forward rotation of the drive motor 30, it is also necessary to overcome the force of deformation of the torsion spring. Specifically, the greater the angle at which the drive motor 30 rotates in the forward direction, the greater the opening of the valve. On the contrary, when the drive motor 30 stops running, the output shaft 50 is driven to reverse under the restoring force of the torsion spring, even if the opening of the valve decreases, ultimately completing the function of closing the valve.

Specifically, the sequential order of the motor shaft 31, the output shaft 50, and the compact gear assembly can be: output shaft 50, sector gear 43, motor shaft 31, first reduction gear 41, and second reduction gear 42. It should be noted that the motor shaft 31 is cooperatively connected to the matching groove 44 of the sector gear 43. Correspondingly, in the related art, for example, the order of arrangement is: output shaft 50, sector gear 43, first reduction gear 41, second reduction gear 42, and motor shaft 31. That is, the difference between this technical solution and the related art is that using the matching groove 44 disposed on the sector gear 43 to fix the position of the motor shaft 31 between the sector gear 43 and the first reduction gear 41, thereby reducing the internal space, making the positions of various components of the electronic control actuator 100 more compact with each other, achieving the effect of efficient layout. In addition, it can be understood that the position of the drive motor 30 has been adjusted from the side position on the side wall 14 to the middle position of the side wall 14, thereby enabling the air-cooled element 11 to be arranged around the periphery of the motor-mounting part 13, enabling sufficient heat dissipation of the drive motor 30 during operation, further improving the heat exchange efficiency between the internal and external installation environments of the electronic control actuator 100, avoiding the possibility of malfunction of the electronic control actuator 100 due to untimely heat dissipation and shortening its service life.

Example 2

The disclosure also provides an exhaust gas treatment system comprising the electronic control actuator 100 of Example 1. Thus, the technical effect corresponding to any of the technical solutions in Example 1 can also be achieved, which will not be repeated herein.

Preferably, the system further comprises an exhaust gas circulation pipeline and a valve disposed on the exhaust gas circulation pipeline; the electronic control actuator 100 is configured to control the opening or closing of the valve.

For example, the exhaust gas treatment system can be a turbocharging system, an exhaust braking system, and an exhaust gas recirculation system.

Example 3

The disclosure also provides a vehicle that comprises, for example, an electronic control actuator 100 as described in Example 1. Accordingly, Example 3 can achieve the technical effect corresponding to any of the technical solutions in Example 1. Alternatively, the vehicle comprises the exhaust gas treatment system provided in Example 2. Correspondingly, Example 3 can achieve the technical effect corresponding to any of the technical solutions in Example 2, which will not be discussed again here. For example, the vehicle can be: cars, trucks, commercial vehicles, etc.

It will be obvious to those skilled in the art that changes and modifications may be made, and therefore, the aim in the appended claims is to cover all such changes and modifications.

What is claimed is:

1. An electronic control actuator, comprising:
  a lower housing and an upper housing, the lower housing or the upper housing comprising a plurality of first matching holes, and the lower housing and the upper housing cooperating to form an installation space;
  an isolation plate disposed between the lower housing and the upper housing, the isolation plate comprising a plurality of second matching holes, and a plurality of locating pins respectively passing through the plurality of first matching holes and the plurality of second matching holes; and
  a compact gear assembly and a drive motor both disposed in the installation space, and the compact gear assembly being cooperatively connected to the drive motor; wherein:
  the compact gear assembly comprises:
    a first reduction gear, in transmission connection to a motor shaft of the drive motor at a first location;
    a second reduction gear, fixedly coaxially connected to the first reduction gear; and
    a sector gear, the sector gear being meshed with the second reduction gear at a second location; the sector gear being coaxially rotationally connected to an output shaft; and the sector gear comprising a matching groove;
  the motor shaft extends through the matching groove in the sector gear; the second reduction gear is disposed between the drive motor and the first reduction gear; whereby both the second reduction gear and the sector gear are disposed between the drive motor and the first reduction gear; and the second location is disposed adjacent to the drive motor with respect to the first location along an axial direction of the motor shaft;
  the lower housing comprises a limiting part disposed on one side of the locating pins away from the first matching holes; the limiting part comprises a support surface, and when the lower housing is cooperatively connected to the upper housing, the support surface abuts against one side of the isolation plate away from the first matching holes; and
  the lower housing comprises a side wall, a motor-mounting part, an air-cooled element, and a water-cooled element; the motor-mounting part is disposed in a middle of the side wall; the air-cooled element is disposed around the motor-mounting part; the water-cooled element is disposed in the side wall and corresponds to the air-cooled part; and the water-cooled element is disposed around the motor-mounting part.

2. The electronic control actuator of claim 1, wherein the first matching holes are two in number, and are disposed along a diagonal of the lower housing or the upper housing.

3. The electronic control actuator of claim 1, wherein the matching groove is an arc-shaped structure, and a distance between a motion trajectory of the motor shaft within the arc-shaped structure and a root circle of the sector gear is constant.

4. The electronic control actuator of claim 3, further comprising:

the output shaft, disposed on the upper housing and coaxially rotationally connected to the sector gear;

a locating part sleeving the output shaft; and an elastic member sleeving the output shaft, the elastic member comprising a first end and a second end opposite to the first end, and the first end being connected to the locating part, and the second end being cooperatively connected to the upper housing.

5. The electronic control actuator of claim 4, wherein one side of the locating part facing the elastic member comprises a first groove, and the first end is cooperatively limited in the first groove; the upper housing comprises a second groove, and the second end is cooperatively limited in the second groove; and the locating part is rotatable along with the rotation of the output shaft.

6. An exhaust gas treatment system, comprising the electronic control actuator of claim 1.

7. The system of claim 6, further comprising an exhaust gas circulation pipeline and a valve disposed on the exhaust gas circulation pipeline, wherein the electronic control actuator is configured to control the opening or closing of the valve.

8. A vehicle, comprising the exhaust gas treatment system of claim 6.

* * * * *